(12) United States Patent
Niemi et al.

(10) Patent No.: US 9,393,593 B2
(45) Date of Patent: Jul. 19, 2016

(54) METHOD AND APPARATUS FOR CONTROLLING A COATING HEAD, AND A COATING HEAD

(75) Inventors: Olli Niemi, Helsinki (FI); Tatu Pitkänen, Nummenkylä (FI)

(73) Assignee: Valmet Technologies, Inc., Espoo (FI)

( * ) Notice: Subject to any disclaimer, the term of this patent is extended or adjusted under 35 U.S.C. 154(b) by 617 days.

(21) Appl. No.: 13/699,703

(22) PCT Filed: May 25, 2010

(86) PCT No.: PCT/FI2010/050422
§ 371 (c)(1),
(2), (4) Date: Nov. 23, 2012

(87) PCT Pub. No.: WO2011/148031
PCT Pub. Date: Dec. 1, 2011

(65) Prior Publication Data
US 2013/0064968 A1    Mar. 14, 2013

(51) Int. Cl.
| | |
|---|---|
| *B05D 1/40* | (2006.01) |
| *D06C 15/00* | (2006.01) |
| *D06C 15/02* | (2006.01) |
| *D06B 23/02* | (2006.01) |
| *D06B 1/14* | (2006.01) |

(Continued)

(52) U.S. Cl.
CPC . *B05D 1/40* (2013.01); *B05C 11/04* (2013.01); *B05C 11/041* (2013.01); *B05C 11/044* (2013.01); *B05D 3/12* (2013.01); *D06B 1/141* (2013.01); *D06B 1/143* (2013.01); *D06B 1/146* (2013.01); *D06B 23/02* (2013.01); *D06B 23/021* (2013.01); *D06B 23/023* (2013.01); *D06C 15/00* (2013.01); *D06C 15/02* (2013.01);

*G01L 5/0085* (2013.01); *B05D 2203/22* (2013.01); *B05D 2252/00* (2013.01); *D21H 23/34* (2013.01); *D21H 23/78* (2013.01)

(58) Field of Classification Search
None
See application file for complete search history.

(56) References Cited

U.S. PATENT DOCUMENTS

| | | | |
|---|---|---|---|
| 5,597,415 A * | 1/1997 | Graf | B05C 11/042 101/157 |
| 6,387,214 B1 | 5/2002 | Kustermann et al. | |
| 2004/0244609 A1 | 12/2004 | Muhs | |

FOREIGN PATENT DOCUMENTS

| | | |
|---|---|---|
| DE | 19627456 A1 | 1/1998 |
| JP | 5015833 A | 1/1993 |

(Continued)

OTHER PUBLICATIONS

International Search Report for PCT/FI2010/050422 dated Mar. 7, 2011.

(Continued)

*Primary Examiner* — William Phillip Fletcher, III
(74) *Attorney, Agent, or Firm* — Stiennon & Stiennon

(57) ABSTRACT

A method and apparatus are described for controlling a coating head, which exerts a nip pressure to a fibrous web to be coated while the fibrous web is supported by a backing roll. An output signal of a sensor integrated within the backing roll is read, thus producing a measured indication of the nip pressure. A number of actuator control values are derived at least partly from said measured indication of the nip pressure. Said actuator control values are delivered as commands to a number of respective actuators that contribute to creating the nip pressure, to control an amount of a coating substance on the fibrous web in the coating head.

16 Claims, 3 Drawing Sheets

(51) Int. Cl.
   *B05D 3/12*   (2006.01)
   *D21H 23/78*  (2006.01)
   *B05C 11/04*  (2006.01)
   *G01L 5/00*   (2006.01)
   *D21H 23/34*  (2006.01)

(56) References Cited

FOREIGN PATENT DOCUMENTS

| JP | H05-015833 A | * | 1/1993 |
| JP | 2005219054 A |   | 8/2005 |
| WO | 2006075055 A1 |   | 7/2006 |
| WO | 2006075056 A1 |   | 7/2006 |
| WO | 2007107625 A1 |   | 9/2007 |
| WO | 2009092761 A2 |   | 7/2009 |
| WO | 2009101251 A2 |   | 8/2009 |
| WO | WO 2009/101251 A2 | * | 8/2009 |

OTHER PUBLICATIONS

Written Opinion of the International Searching Authority for PCT/FI2010/050422 dated Mar. 7, 2011.

\* cited by examiner

US 9,393,593 B2

METHOD AND APPARATUS FOR CONTROLLING A COATING HEAD, AND A COATING HEAD

CROSS REFERENCES TO RELATED APPLICATIONS

This application is a U.S. national stage application of International App. No. PCT/FI2010/050422, filed May 25, 2010, the disclosure of which is incorporated herein by reference.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention relates to controlling a coating head that is configured to exert a nip pressure to a fibrous web to be coated, while the fibrous web is supported by a backing roll.

Monitoring and controlling the behavior of the coating blade, as well as its position in relation to the fibrous web to be coated, is important, when the operation of a coating head and the machine of which it forms a part is to be optimized. Similar problems and objectives sometimes come up in controlling the rod load in rod coating or film transfer coating.

The Japanese patent publication JP 5015833 (A) (also expressed as JP 05015833 A), published on Jan. 26, 1993, and assigned to Mitsubishi Paper Mills Ltd., discloses an arrangement for monitoring and adjusting the coating profile. It suggests using a row of controllable actuators to move the profiler bar that exerts transverse pressure to the coating blade, and integrating an electronically readable pressure sensor to each actuator. According to said publication, the electronically collected readings of the pressure sensors can be used to represent the pressure profile, and if the actuators are machine-operated, even to implement some kind of automatic feedback from the pressure sensor readings to the actuators.

Another prior art solution is known from the Japanese patent publication JP 2005219054, published Aug. 18, 2005, and assigned to Mitsubishi Paper Mills Ltd. It suggests monitoring the coating profile with a BM meter (Basis Mass; more commonly referred to as Basis Weight or BW) located downstream from the coating head, calculating a floating average of the measurements, and using them to automatically adjust the actuators that move the profiler bar.

Yet another known solution is the use of position sensors in the actuators to describe the physical location of each actuator that supports the profiler bar.

The known solutions involve certain drawbacks. A measurement device integrated in the actuator, like in JP 5015833 (A), gives readings that describe primarily the stress distribution in the profiler bar, from which it is not possible to unambiguously derive all desired characteristics of the coating blade. A scanning profile measurement, like in JP 2005-219054, is not capable of appropriately telling cross-directional phenomena from machine-directional ones, and suffers from the inherent delays related to the physical distance between the coating head and the measurement frame as well as the time it takes to scan the whole width of the fibrous web. Position sensors give information only about the location of the actuators, which does not take into account e.g. the possibly uneven abrasion of the blade or the cyclic machine-directional interference resulting from a slight eccentricity of the backing roll.

SUMMARY OF THE INVENTION

According to an aspect of the present invention there is provided a simple and robust method and arrangement for monitoring and controlling the nip pressure in a coating head. According to another aspect of the present invention, controlling the nip pressure in a coating head is fast and effective enough to enable using it to compensate for certain sources of interference and irregularity in processing a fibrous web.

The objectives of the invention are achieved by using a so-called intelligent roll to measure the nip pressure of the coating head, and by providing a sufficiently fast and effective feedback coupling from the measured nip pressure to the actuators that contribute to creating the nip pressure.

A method according to the invention is characterized by reading an output signal of a sensor integrated within the backing roll deriving a number of actuator control values at least partly from said measured indication of the nip pressure, and delivering said actuator control values as commands to a number of respective actuators that contribute to creating the nip pressure, to control an amount of a coating substance on the fibrous web in the coating head.

An arrangement according to the invention is characterized by a sensor integrated within the backing roll, a number of actuators configured to contribute to creating the nip pressure, a reading system configured to read an output signal of said sensor and to produce a measured indication of the nip pressure, and a control unit configured to derive a number of actuator control values at least partly from said measured indication of the nip pressure, and to deliver said actuator control values as commands to said number of actuators for controlling an amount of a coating substance on the fibrous web in the coating head.

The invention itself both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

DESCRIPTION OF THE PREFERRED EMBODIMENTS

Figure 1:
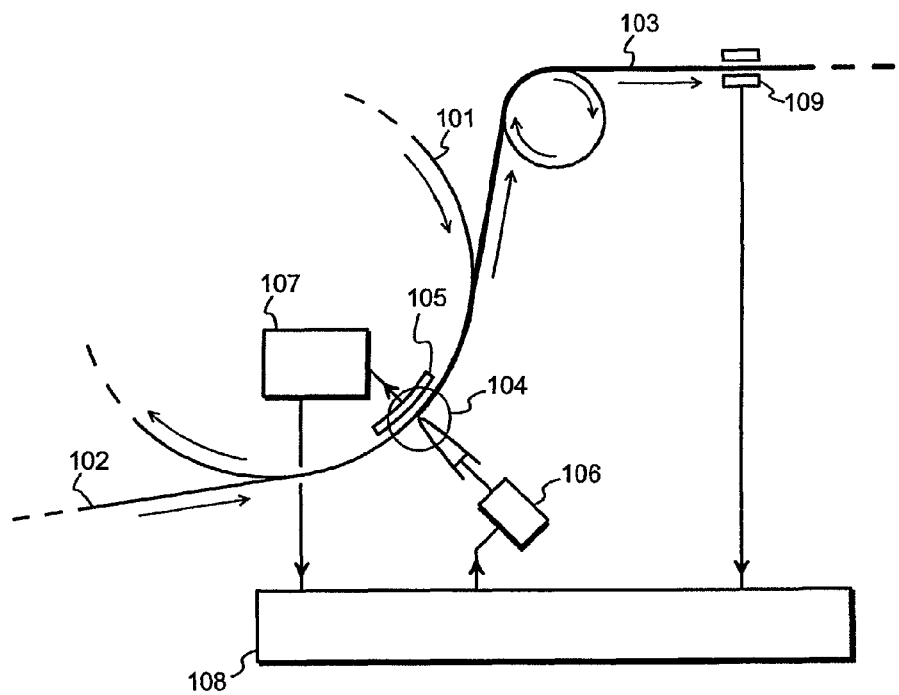
FIG. 1 illustrates a principle according to an embodiment of the invention.

FIG. 1 is a schematic illustration of the principle of an arrangement according to an embodiment of the invention. The arrangement is provided for controlling a coating head, which in turn is configured to exert a nip pressure to a fibrous web to be coated while the fibrous web is supported by a backing roll. FIG. 1 shows a part of the backing roll 101. The fibrous web to be coated 102 comes from the left, and the coated fibrous web 103 leaves to the right in FIG. 1. At the lower right part of the backing roll 101 a layer of coating substance is spread on the fibrous web, with a spreading apparatus 110 as illustrated in FIG. 1; the exact method utilized for spreading the coating substance has no significance to the present invention. A nip exists at point 104 for controlling the amount of coating substance that will adhere to the fibrous web.

Figures 2, 3:
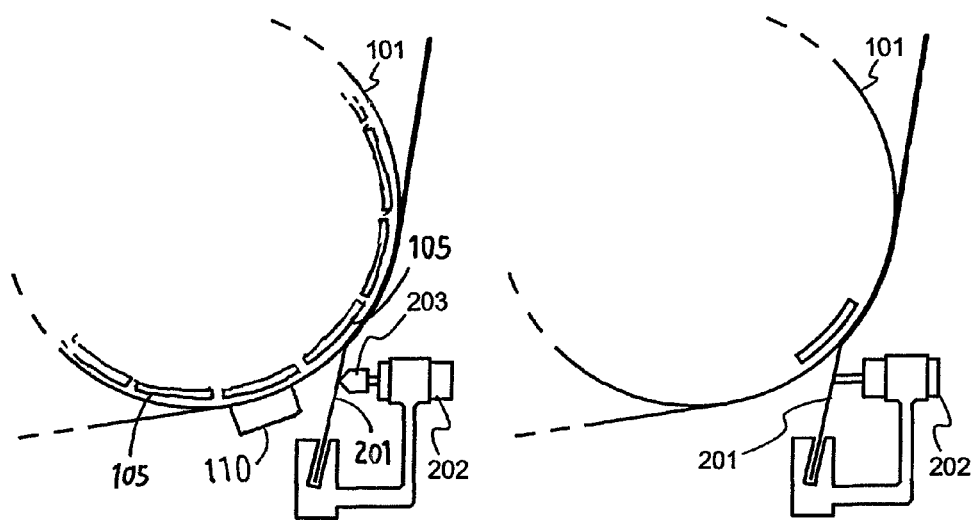
FIG. 2 illustrates the use of a coating blade with a profiler bar.
FIG. 3 illustrates the use of a coating blade without a profiler bar.

Various possibilities exist and are known for implementing the nip. FIGS. 2 and 3 illustrate schematically the principle of blade coating, in which the nip is implemented with a coating blade 201 that extends transversely across the fibrous web. Actuators 202 are configured to press the coating blade 201 toward the fibrous web. This way a narrow slit is created between the coating blade 201 and the backing roll 101, through which slit the fibrous web must pass. The arrangement may comprise a profiler bar 203 located between the actuators 202 and the coating blade 201, like in FIG. 2, or in some cases the actuators 202 may press directly the coating blade 201, like in FIG. 3. In embodiments using a profiler bar we may say that the actuators press the coating blade indirectly through acting upon the profiler bar, which then presses the coating blade toward the fibrous web. The coating substance is spread in fluid form onto the fibrous web immediately before the coating blade, so that the width of the slit between the coating blade and the backing roll essentially determines the amount of coating substance that is allowed to remain on the fibrous web. In rod coating or film transfer coating the nip is created between the backing roll and a revolving rod, which in rod coating simultaneously both spreads the coating substance and regulates its amount on the surface of the fibrous web. In blade coating, rod coating, and film transfer coating there is a distribution of force in the cross direction, i.e. along the longitudinal direction of the blade or rod. With said force the blade or rod is pressed toward the fibrous web, which creates a distribution of nip pressure along the linear region of the fibrous web that is passing through the nip.

According to an aspect of the present invention, by accurately finding out the momentary amount and distribution of nip pressure in the coating nip, it is possible to gain valuable knowledge about what actually happens at the region which has crucial importance to the coating result in terms of overall amount and spatial regularity of the coating. However, as was pointed out in the description of prior art, the previously known approach of integrating pressure sensors to the actuators that push a profiler bar against the coating blade fails to give accurate information about the actual nip pressure. Instead, according to an aspect of the present invention, such information can be obtained by observing pressure-related effects on the appropriate surface region of the backing roll.

Integrating measurement sensors on the surface of a roll is known as such. For example the international patent application published as WO 2007/107625 discloses a method for measuring forces influencing the roll of a paper, board, finishing or printing machine by using a force sensor in the form of a film mounted on or under the surface of the roll. In said patent application the power sensor is mounted on the surface of the roll essentially in the circumferential direction. The international patent application published as WO 2006/075056 specifically suggests using a sensor integrated in a roll measure nip pressure. The international patent application published as WO 2006/075055 discloses the use of a helical pressure-sensitive sensor on the surface of a roll to measure the web tension profile. The international patent application published as WO 2009/092761 suggests using a measurement sensor in a support roll of a coating station. The four international patent applications published as WO 2007/107625, WO 2006/075056, WO 2006/075055, and WO 2009/092761 and its U.S. equivalent US Publication No. 2011/0020532, published Jan. 27, 2011, are incorporated herein by reference.

According to the principle illustrated in FIG. 1, a sensor 105 is integrated within the backing roll 101. For reasons of graphical clarity the sensor 105 is here illustrated clearly below the surface of the backing roll, but as disclosed e.g. in the three international patent applications mentioned above, it can be at or very close to the outmost surface of the roll. Also illustrated schematically in FIG. 1 is actuator 106, which here represents a number of actuators that are configured to contribute to creating the nip pressure.

The arrangement further comprises a reading system 107 that is configured to read an output signal of the sensor 105, and to use said output signal to produce a measured indication of the nip pressure. Although the reading system 107 is here illustrated as if it was implemented within the backing roll 101, in practice it is possible that the reading system comprises parts both in the roll and in the surrounding machinery. For example, if the sensor 105 is based on an electromechanical film or a piezoelectric strip, its momentary output signal is basically an analog voltage signal. Reading said voltage signal and converting it into digital form may necessitate the use of a preamplifier and an analog to digital converter, which may be located within the roll. Converting the digitized output voltage of the sensor further to a measured indication of the nip pressure may necessitate using further information about e.g. the momentary rotational position of the roll, and may take place at a location outside the roll, to which location information about the digitized output voltage of the sensor is conveyed through suitable communications means. The actual implementation of the reading system, as well as the distribution of its functionalities into the various parts of the overall arrangement, is not significant to the present invention.

The arrangement comprises a control unit 108, which is configured to derive a number of actuator control values at least partly from the measured indication of the nip pressure. Additionally the control unit 108 is configured to deliver the actuator control values as commands to the number of actuators, of which actuator 106 is an example, for controlling an amount of a coating substance on the fibrous web in the coating head.

Numerous approaches may be taken as the basis for the operation of the control unit 108. If the signal processing and actuator operation functions are fast enough, and if the control algorithms executed in the control unit 108 are clever enough, the arrangement can be used to quickly and automatically compensate for detected irregularities in nip pressure that originate from blade vibrations, backing roll eccentricity, or elastic deformations in the blade support beam. A simple operating model of the control unit may aim at just keeping the nip pressure constant, so that a detected local increase in nip pressure at a location that corresponds to the location of a particular actuator is compensated by delivering to that actuator a control value that causes the actuator to retract slightly, and vice versa. In more sophisticated applications the control unit may receive information about detected and/or anticipated phenomena somewhere else in the coating head or even other parts of the coating machine, and deliberately create variations in nip pressure in order to pro-actively compensate for such phenomena.

As an example of information obtained from elsewhere in the process, FIG. 1 illustrates a measurement device 109, which is located somewhere downstream from the coating head in the direction of movement of the fibrous web. As an example, the measurement device 109 may comprise a measurement frame and a dry weight meter configured to perform a scanning measurement of dry weight across the fibrous web. From a subtraction of the results from dry weight measurements before and after the coating head, the overall coating amount on the fibrous web after the coating head can be deduced. If roll-integrated sensors are used also in other parts of the machine, a corresponding indication of the overall amount of coating can be obtained from e.g. a tension measurement on a surface of a roll in a reel.

The control unit 108 is configured to receive from the measurement device 109 an indication of an amount of coating on the fibrous web downstream from the coating head in the direction of movement of the fibrous web. Since there is an objective of using some particular, most advantageous amount of coating, the measured amount of coating can be used to check, how close to the optimal amount the currently achieved result is. The control unit 108 knows how to take the observed deviation from the optimal value into account in deriving the control values for all actuators that contribute to creating the nip pressure. In other words, the control unit 108 is configured to use a contribution indicative of the measured amount of coating in deriving the number of actuator control values that it then delivers to the respective actuators. It is natural to assume that for example if the measured amount of coating is lower than the optimal value, the control unit instructs all actuators to retract slightly, and vice versa.

Figure 4:
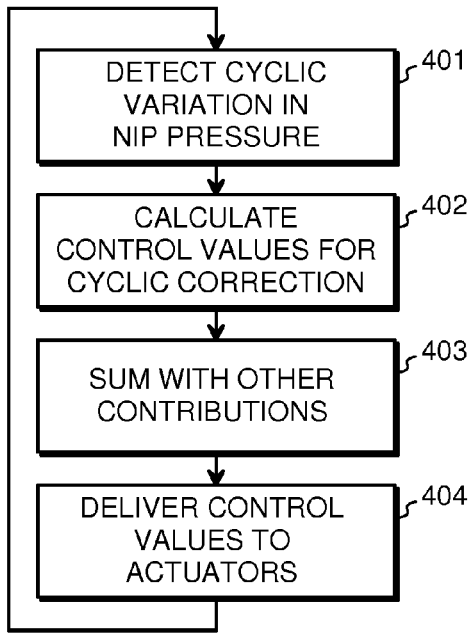
FIG. 4 illustrates a method according to an embodiment of the invention.

As a specific example of the operation of the control unit, FIG. 4 illustrates schematically a method for compensating for cyclic variations in nip pressure. One possible source of cyclic variations is an eccentricity of the backing roll, which may occur in the backing roll as a whole or only at some part of it. Other possible sources of cyclic variations include, but are not limited to, resonant vibrations in the structures of the coating head, as well as machine direction oscillations in the thickness of the fibrous web that exist already when the fibrous web comes to the coating head. For example, a coating machine may comprise a number (say, four) of coating heads, in which case any machine direction interference that occurred in one of the previous coating heads may be observed in the later coating heads as a machine direction oscillation in web thickness. The structures of the different coating heads may have essentially similar features, which means that machine direction interference may occur at essentially the same frequency in all of them, and even accumulate toward the end of the coating machine in a particularly awkward way. It should be noted that a scanning measurement of web thickness at a measurement frame has a certain sampling frequency, which in the worst case may fold together with a fast machine direction oscillation to produce measurement results in the form of an envelope curve that has little relevance to the actual thickness variations or coat weight variations of the web.

Step 401 in FIG. 4 represents detecting cyclic variations in nip pressure. This step requires that output signals from the sensor in the backing roll have been repeatedly read and converted into a form in which they can be processed with a signal processing algorithm (or, as an alternative, driven through a filter bank). Methods and signal processing arrangements for detecting cyclic variations in a signal are well known as such, and the selection of method and arrangement has no significance to the present invention. Step 402 represents calculating control values for the actuators that would implement a cyclic correction, i.e. a cyclic change in the created nip pressure that has the same frequency and amplitude as the detected cyclic variation but with a phase shift of pi radians. In FIG. 4 it is assumed that the corrections required to compensate for the detected cyclic variations in nip pressure are not the only contribution to the derivation of the control values, so step 403 represents summing the control values obtained at step 402 with other contributions to obtain the control values. Thus, both step 402 and step 403 belong to the wider concept of deriving a number of actuator control values.

Step 404 represents delivering the calculated actuator control values as commands to the respective actuators that contribute to creating the nip pressure. After that the execution of the method is started anew from step 401. Assuming that a major source of the originally detected cyclic variation in nip pressure was an eccentricity of the backing roll, as a result of repeatedly executing the loop consisting of states 401, 402, 403, and 404, the actuators are operated cyclically in phase with a rotation of the backing roll around its longitudinal rotation axis. Thus the eccentricity of the backing roll in relation to said rotation axis is compensated for. Similarly if a major source of the originally detected cyclic variation in nip pressure was a resonant oscillation in the coating blade or the blade support beam, repeatedly executing a method according to FIG. 4 will compensate for such oscillations. For the person skilled in the art it is clear that just like many other control algorithms in industrial applications, the control algorithm illustrated schematically in FIG. 4 is in reality not necessarily executed in any strictly stepwise manner, but for example during the calculation of control values based on previous measurements of cyclic variations the next measurements may already be taking place.

Figure 5:
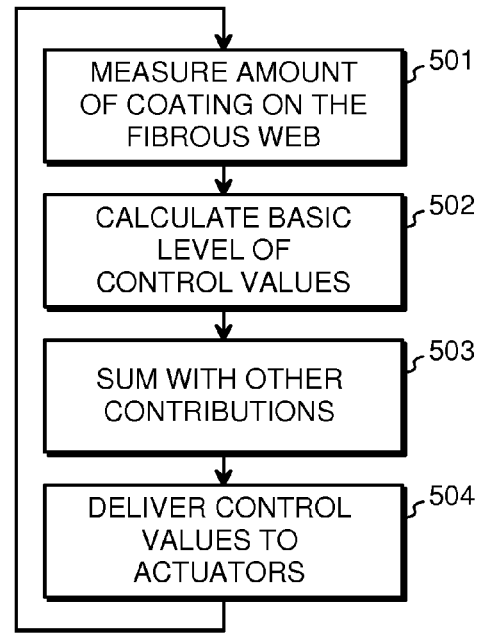
FIG. 5 illustrates a method according to another embodiment of the invention.

FIG. 5 illustrates schematically a method for compensating for slower machine direction variations in the amount of coating. Step 501 represents measuring an amount of coating on the fibrous web downstream from the coating head in a direction of movement of the fibrous web. Such a measurement typically involves a certain degree of averaging, because e.g. in a scanning measurement the scanning time across the whole width of the web may be 20-30 seconds in a wide machine. It should be noted that a traditional scanning measurement at a measurement frame is not capable of properly differentiating between fast machine direction and cross direction phenomena. Therefore it is particularly advantageous in the present invention to additionally use a method according to the principle illustrated in FIG. 4 to reduce the effect of fast machine direction variations, which could otherwise be confused with assumed cross direction phenomena at the scanning measurement.

Step 502 in FIG. 5 represents calculating what could be called the basic level of control values. The designation "basic level" means here that a basic distribution of nip pressure, which corresponds to an even coating of the desired optimal thickness and which changes at most slowly, should be created. In the ideal situation the basic level of control values calculated at step 502 would remain the same, and the measurement of step 501 would constantly show the amount of coating to be at the optimal value. As with the method of FIG. 4, it is assumed that the corrections required to tune the obtained overall thickness of coating toward the optimum value are not the only contribution to the derivation of the control values, so step 503 represents summing the control values obtained at step 502 with other contributions to obtain the control values. Steps 502 and 503 thus belong to the wider concept of deriving a number of actuator control values, wherein a contribution indicative of the measured amount of coating is used in said deriving of the actuator control values. Step 504 represents delivering the calculated actuator control values as commands to the respective actuators that contribute to creating the nip pressure.

Figure 6:
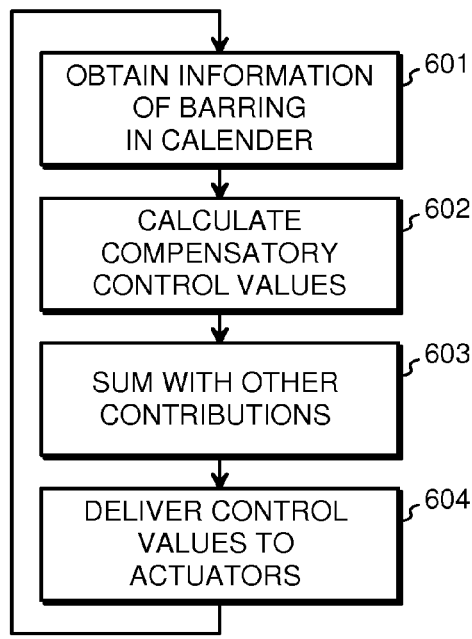
FIG. 6 illustrates a method according to another embodiment of the invention.

FIG. 6 illustrates schematically a method for compensating for other phenomena, which originally may be not directly associated with coating layer thickness, coat weight or nip pressure at a coating head at all. As an example we may consider the so-called barring, which is a general definition of phenomena such as self excited vibration of the calender stack and regenerative wear of the calender rolls. Since barring is an oscillatory phenomenon by nature, it may be possible to balance and partially prevent it by deliberately introducing oscillatory excitation signals at a correct frequency and phase that counteract the original mechanisms that create barring.

For that purpose step 601 represents obtaining information indicative of barring oscillations in a calender that is located downstream from the coating head in a direction of movement of the fibrous web. Step 602 represents calculating compensatory values that, when put into effect, will cause deliberate variations in nip pressure at the coating head. These in turn will cause deliberate variations in coating layer thickness or coat weight. As the fibrous web proceeds to the calender, said variations in coating layer thickness or coat weight will cause roll bearings in the calender to experience cyclically changing variations in the tension forces that are created in supporting the rolls. In order to have the proper effect at the calender, the deliberately created variations in coating layer thickness or coat weight must have a spatial frequency and phase that correspond to a frequency of said barring oscillations, the distance between the coating head and said calender in the direction of movement of the fibrous web, and a propagation rate of the fibrous web. If and when all these phenomena can be properly taken into account, the contributions to the actuator control values that are calculated at step 602 will effect compensating for the barring oscillations. As with the methods of FIGS. 4 and 5, the method of FIG. 6 comprises the summing step 603 and the step of delivering the derived actuator control values as commands to the respective actuators that contribute to creating the nip pressure 604.

Above we have not made any particular assumptions about the actuators that contribute to creating the nip pressure at the coating head, apart from the natural assumption that they are available and capable of performing the required task. However, the selection of actuators for the purposes of the present invention is not trivial. Traditionally used actuators comprise for example a linear screw and an electric motor that drives a nut around the linear screw. Such an actuator is accurate and powerful, but not particularly fast, at least not without sacrificing one or the other of the first-mentioned characteristics. Also hydraulic actuators have been used, where a proportional- or servo valve regulates the flow of hydraulic fluid to and from a working cylinder. As in the case of linear screws, it is difficult to build a hydraulic actuator so that it would simultaneously fulfil all three requirements of accuracy, power, and fast response, preferably combined with a reasonable price and robustness of operation in demanding industrial conditions.

Figure 7:
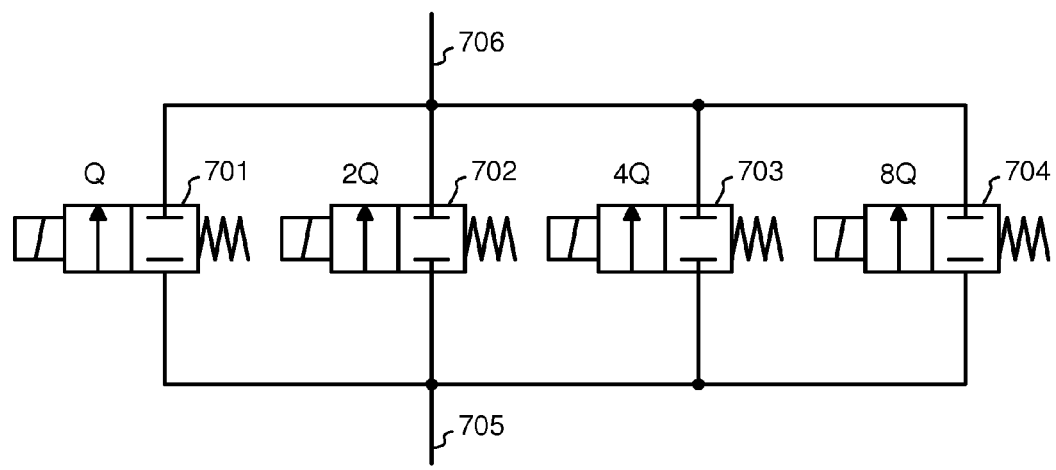
FIG. 7 illustrates the principle of a hydraulic digital to analog converter.

According to an embodiment of the present invention, the principle of deriving actuator control values that was described above is coupled to using digital hydraulic actuators. A digital hydraulic actuator is one which comprises a number of on/off type (i.e. digitally operated) hydraulic valves, and the displacement and/or output force of which depends on how many of said valves are open at one time. FIG. 7 illustrates the principle of a so-called hydraulic digital to analog converter, which has four on/off valves 701, 702, 703, and 704 coupled in parallel between an input 705 and an output 706. The flow rates in open state of the valves are Q, 2Q, 4Q, and 8Q from left to right, where Q is the flow rate of valve 701 in open state. The combined flow rate through a hydraulic digital to analog converter with n component valves with exponentially increasing flow rates has $2^n$ possible values, and it can be controlled with a digital word n bits long.

Figure 8:
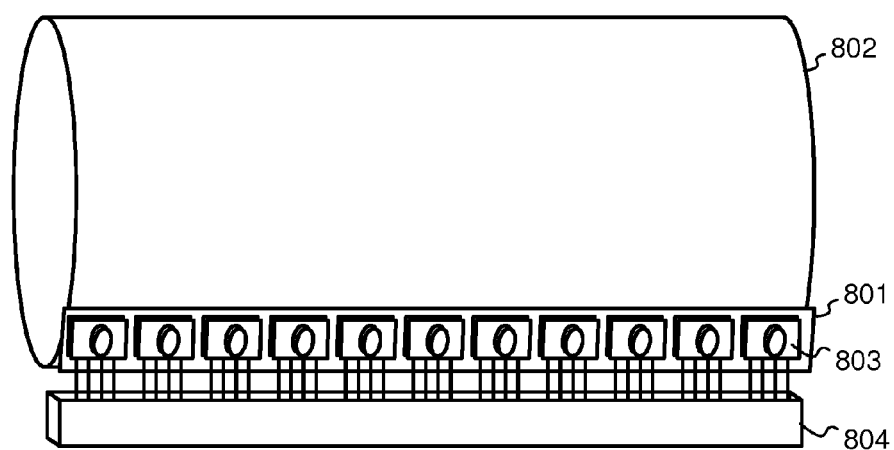
FIG. 8 illustrates the use of a number of digital hydraulic actuators along a coating blade.

FIG. 8 illustrates schematically a coating head in which a number of actuators are configured to press a coating blade 801 toward a backing roll 802. Actuator 803 is shown as an example. The actuators are located at regular intervals along the length of the coating blade 801. The fact that the actuators are digital hydraulic actuators is emphasized schematically in FIG. 8 by showing four control lines from an actuator controller 804 to each actuator, as if each actuator comprised four hydraulic on/off valves in parallel like in FIG. 7, and as if each actuator was controlled with a four-bit word delivered along a parallel bus from the actuator controller. The number of distinct valves in each digital hydraulic actuator is not significant to the purposes of the present invention, so it may differ even very much from four. As with all applications of digital hydraulics, the number of valves is a compromise between cost and desired size of the quantization step in the phenomenon to be controlled.

The combination of measuring the nip pressure with a sensor integrated in the backing roll and using digital hydraulic actuators is so advantageous and complete in implementing all desired functions of controlling the nip that it may allow deriving the actuator control values completely without any feedback from LVDT (Linear Variable Differential Transformer) sensors or any other detection of current position of individual actuators. Significant savings in both manufacturing cost and complicatedness of implementation may be achieved by leaving out the position sensors, which have been considered essential in prior art nip control arrangements. If position sensors are to be left out, it is preferable to manufacture the profiler bar of a material that has a high enough yield point, so that it is unlikely that a yield point of the material could be reached during normal operation of the actuators. For example some titanium alloys and composite materials fulfill this requirement of high yield point. If the number of actuators is sufficiently large and consequently the distance between adjacent actuators along the coating blade is short enough, it is possible to leave out the profiler bar altogether and to make the actuators act directly upon the coating blade. Leaving out the profiler bar would enable dimensioning the actuators for a smaller required maximum output force.

The invention is applicable to both stiff blade and bent blade mode driving of the coating head. It is even possible to operate on the so-called grey zone between stiff and bent blade mode driving, because it is possible to deduce the direction of the response locally from the changes in the nip pressure, even if the response behaved differently at different locations in the cross direction of the machine. The invention is also applicable to controlling a nip pressure between rolls in a film transfer coating head, utilizing sensors integrated in the rolls. If the actuators (typically: actuator cylinders, electromechanical actuators or digital hydraulic actuators) of such a film transfer coating head are fast enough, it is possible to utilize the principle explained above to compensate for vibrations that occur in such a film transfer coating head.

A particular advantage of the invention is the possibility to base the fast and active control of nip pressure in a coating head on nip pressure measured from a rotating roll, which means that run-time control of the nip pressure profile is force based (as opposed to the location based control of most prior art systems). Combined with the use of fast digital hydraulic actuators, and preferably also combined with a later measurement of overall coating amount to obtain the basic level of control values, the force-based measurement gives superior results in obtained coating smoothness and dynamic controllability of the whole coating process.

The invention claimed is:

1. A method for controlling a coating head configured to exert a nip pressure profile to a fibrous web to be coated while the fibrous web is supported by a backing roll and advancing in a machine direction, comprising the steps of:
    reading an output signal of a sensor which is integrated within the backing roll and which extends in a cross direction perpendicular to the machine direction, thereby producing a measured indication of the nip pressure profile of the coating head in the cross direction;
    deriving a plurality of actuator control values at least partly from the measured indication of the nip pressure profile;
    delivering the actuator control values as commands to a plurality of actuators, the commands causing the actuators to press indirectly on a coating blade through a profiler bar, wherein the pressing of the actuators affects the measured indication of the nip pressure profile, and wherein the delivered commands act to control an amount of a coating substance applied on the fibrous web;
    measuring the amount of coating on the fibrous web downstream from the coating head in a direction of movement of the fibrous web
    determining, from the measured amount of coating on the fibrous web any deviation from a desired amount of coating and determining any required deviation of the nip pressure profile needed to achieve the desired amount of coating on the fibrous web; and
    calculating and delivering new actuator values to the plurality of actuators to effect the required deviation of the nip pressure profile.

2. The method of claim 1, wherein the plurality of actuators are operated cyclically in phase with a rotation of the backing roll around a longitudinal rotation axis.

3. The method of claim 1, wherein the actuator control values are digital values and the actuators are digital hydraulic actuators.

4. The method of claim 1, wherein the amount of coating on the fibrous web is measured by a scanning measurement of dry weight across the fibrous web, or a tension measurement on a surface of a roll in a reel.

5. The method of claim 1, wherein the nip pressure profile is used to control amount of coating on the fibrous web to counteract barring oscillations in a downstream calender.

6. The method of claim 1, wherein the step of deriving said plurality of actuator control values is executed without feedback from any detected current position of individual actuators.

7. An arrangement for controlling a coating head configured to exert a nip pressure profile to a fibrous web to be coated while the fibrous web is supported by a backing roll, wherein the arrangement comprises:
    a sensor integrated within the backing roll;
    a plurality of actuators configured to engage the fibrous web with the backing roll to apply at least a part of the nip pressure;
    a reading system configured to read an output signal of the sensor and to produce a measured indication of the nip pressure; and
    a control unit configured to derive a plurality of actuator control values at least partly from the measured indication of the nip pressure, and to deliver the actuator control values as commands to the plurality of actuators arranged to press indirectly on a coating blade through a profiler bar, thereby controlling an amount of a coating substance applied on the fibrous web in the coating head,
    wherein the control unit is configured to receive from a measurement device an indication of an amount of coating on the fibrous web downstream from the coating head in a direction of movement of the fibrous web,
    wherein the control unit is configured to determine, from the indication of the amount of coating, any deviation from a desired amount of coating and to determine any required deviation of the nip pressure profile needed to achieve the desired amount of coating on the fibrous web, and
    wherein the control unit is configured to calculate and deliver new actuator values to the plurality of actuators to effect the required deviation of nip pressure profile to achieve the desired amount of coating on the fibrous web.

8. The arrangement of claim 7, wherein the actuators are digital hydraulic actuators.

9. The arrangement of claim 7 wherein the nip pressure profile is used to control the amount of coating on the fibrous web to counteract barring oscillations in a downstream calender.

10. A method for controlling the coating of a fiber web, comprising the steps of:
    applying a coating to a fiber web supported by a backing roll as the fiber web travels in a machine direction, the applied coating defining a thickness;
    passing the coating and the fiber web through a cross direction coating metering nip, the cross direction being perpendicular to the machine direction;
    controlling the pressure in the metering nip so as to control the thickness of the applied coating on the fiber web in the cross direction and the machine direction, wherein the step of controlling the pressure in the metering nip is accomplished with a multiplicity of digital hydraulic actuators impinging on a doctor blade, a profiler bar engaging a doctor blade, or a rod which is pressed toward the fibrous web;
    creating a distribution of nip pressure along a linear region of the fibrous web that is passing through the metering nip;
    measuring the pressure in the nip in the cross direction and a circumferential direction with pressure sensors integrated within the backing roll;
    reading an output signal from the pressure sensors and producing a measured indication of the nip pressure profile of the coating head in the cross direction;
    deriving a plurality of actuator control values at least partly from the measured indication of the nip pressure;

driving each of the multiplicity of digital hydraulic actuators with a plurality of digital valves; and delivering the actuator control values as commands to the plurality of digital valves of each of the digital hydraulic actuators.

11. The method of claim 10, further comprising the steps of:

detecting cyclic variations in the metering nip pressure by repeatedly reading and signal processing the metering nip pressure to obtain the cyclic variations in the metering nip pressure actuators; and deriving actuator control values for the actuators that create a cyclic change in the created nip pressure that has the same frequency and amplitude as the detected cyclic variation but with a phase shift of pi radians.

12. The method of claim 10 further comprising the steps of:

measuring an applied coating thickness to the fiber web downstream of the metering nip; and deriving actuator control values at least partly from the coating thickness.

13. The method of claim 12, wherein the amount of coating on the fibrous web is measured by a scanning measurement of dry weight across the fibrous web or a tension measurement on a surface of a roll in a reel.

14. The method of claim 10, further comprising the steps of:

obtaining frequency and phase information with respect to barring in a downstream calender; and deriving actuator control values at least partly from said frequency and phase information to counteract the barring in the downstream calender.

15. The method of claim 10, further comprising the steps of:

detecting cyclic variations in the metering nip pressure by repeatedly reading and signal processing the metering nip pressure to obtain the cyclic variations in the metering nip pressure actuators;

measuring an applied coating thickness to the fiber web downstream of the metering nip; and obtaining frequency and phase information with respect to barring in a downstream calender, wherein the plurality of actuator control values are derived at least partly from adding together the measured indication of the nip pressure with: derived actuator control values that create a cyclic change in the created nip pressure that has the same frequency and amplitude as the detected cyclic variation but with a phase shift of pi radians, derived actuator control values from the coating thickness, and derived actuator control values at least partly from the frequency and phase information to counteract the barring in the downstream calender, thereby controlling the pressure in the metering nip so as to control cross direction and machine direction thickness of the applied coating on the fiber web.

16. The method of claim 10, wherein the step of deriving the plurality of actuator control values is executed without feedback from any detected current position of individual actuators.

* * * * *